United States Patent [19]

Sellner et al.

[11] Patent Number: 4,671,712
[45] Date of Patent: Jun. 9, 1987

[54] CROSS SLIDE FOR A LATHE

[75] Inventors: Jörg Sellner, Linz; Rudolf Siegwert, Leonding, both of Austria; Siegfried Grauli, Gemmingen, Fed. Rep. of Germany

[73] Assignee: Voest-Alpine Aktiengesellschaft, Linz, Austria

[21] Appl. No.: 674,687

[22] Filed: Nov. 26, 1984

[30] Foreign Application Priority Data

Dec. 1, 1983 [AT] Austria .................................. 4193/83

[51] Int. Cl.⁴ ........................... B23C 1/10; B23C 1/12
[52] U.S. Cl. ................................ 409/211; 409/215; 409/231
[58] Field of Search .............. 408/236; 409/201, 204, 409/211, 215, 231, 240; 29/27 C

[56] References Cited

U.S. PATENT DOCUMENTS

| | | | |
|---|---|---|---|
| 3,083,617 | 4/1963 | Swanson et al. | 409/215 |
| 3,096,687 | 7/1963 | Klopp et al. | 409/215 |
| 3,448,656 | 6/1969 | Bottger et al. | 409/215 |
| 3,520,228 | 7/1970 | Wohlfeil | 409/233 |
| 3,735,459 | 5/1973 | Allen | 408/236 |

FOREIGN PATENT DOCUMENTS

| | | | |
|---|---|---|---|
| 3141657 | 5/1983 | Fed. Rep. of Germany . | |
| 3433252 | 4/1985 | Fed. Rep. of Germany | 409/231 |
| 859052 | 8/1981 | U.S.S.R. | 409/231 |

Primary Examiner—Eugene F. Desmond
Assistant Examiner—Daniel W. Howell
Attorney, Agent, or Firm—Kurt Kelman

[57] ABSTRACT

The tool head of the cross slide of a lathe comprises a tool head housing, which is mounted in a body of the cross slide and angularly adjustable relative to said body, and a tool spindle, which is rotatably mounted in said housing and operatively connected to a drive spindle by an angle drive. To increase the range of operations by which a workpiece can be machined, the tool head housing is mounted in said body so as to be angularly adjustable on the axis of the drive spindle, which is at right angles to the longitudinal axis of the lathe, and the tool head housing is adapted to be coupled to the drive spindle or to the tool spindle.

2 Claims, 4 Drawing Figures

CROSS SLIDE FOR A LATHE

BACKGROUND OF THE INVENTION

1. Field of the Invention

This invention relates to a cross slide for a lathe, comprising a body, a tool head, which consists of a tool head housing which is angularly adjustably mounted in said body, and a tool spindle, which is rotatably mounted in said tool head housing and carries a toolholder for holding a rotary tool and is operatively connected by an angle drive to a drive spindle, which is at right angles to the tool spindle.

2. Description of the Prior Art

In order to permit a workpiece to be machined on a lathe by a rotating tool, such as a boring, drilling or milling tool, it has been proposed to provide a cross slide, which is slidably mounted on a saddle, which is movable along a longitudinal axis defined by the headstock and the tailstock of the lathe, and to provide a tool head, which is mounted on said cross slide and consists of a tool head housing and a driven tool spindle, which is rotatably mounted in said housing. To permit an adjustment of the rotating tool along a longitudinal axis and a transverse axis by the saddle and the cross slide, respectively, the housing is held in a body for angular adjustment about an axis that is parallel to the tool spindle, and the drive spindle, which is at right angles to the tool spindle, is rotatably mounted in said body and is operatively connected to the tool spindle by a miter gear drive, which acts on a shaft that is coaxial to the pivotal axis of the tool head. Whereas the additional adjustment of the tool head permits a machining of grooves for feathers regardless of the dimensions of the workpiece, the machining of the workpiece with the boring, drilling or milling tool is restricted because the orientation of the tool axis relative to the longitudinal axis of the lathe is fixed and cannot be altered. For this reason such known tool heads are used only in conjunction with turrets which are rotatable on an axis which is parallel to the longitudinal axis of the lathe and to the drive spindle associated with the tool head. In said known cross slides the tool head is angularly adjustable by a separate drive, which adds appreciably to the structural expenditure.

SUMMARY OF THE INVENTION

It is an object of the invention to avoid said disadvantages and so to improve a cross slide which is of the kind described first hereinbefore that the range of the operations by which workpieces can be machined can be increased by the provision of a tool head which is adjustable about appropriate axes. Besides, the means for adjusting the tool head should involve only a low structural expenditure.

This object is accomplished in accordance with the invention in that the tool head housing is mounted in the body for an angular adjustment about the drive spindle, which extends at right angles to the longitudinal axis of the lathe, and said tool head housing is adapted to be coupled to the drive spindle or to the tool spindle to prevent relative rotation therebetween.

Because the tool head housing is angularly adjustable about the drive spindle and the latter has a defined orientation, the tool axis can be adjusted to any position between two end positions, in which the tool axis is parallel to and at right angles to the longitudinal axis of the lathe, respectively, so that machining operations in a wide range can be performed. The angular adjustment of the tool head housing relative to the tool head body may be derived from the drive spindle if the tool head housing is non-rotatably coupled to the drive spindle or to the tool spindle so that an additional positioning drive is not required.

It will be understood that the clutch provided between the tool head housing and the tool spindle or the drive spindle must be disengaged when the tool is being driven and in that case the housing must be non-rotatably connected to the body. For this purpose the tool head housing may carry a coupling pin, which is radially adjustable relative to the tool spindle and which is adapted to be received by a coupling recess formed in the tool spindle or in a member that is non-rotatably connected to the tool spindle. The coupling pin is desirably adjustable by a fluid-operable cylinder. When the coupling pin extends into the coupling recess of the tool spindle or of the member that is non-rotatably connected to the tool spindle it will be sufficient to eliminate the non-rotatable connection between the tool head housing and the body and then to operate the means for driving the tool spindle so as to move the tool head to the desired angular position. Thereafter, the tool head housing is coupled to the body before the coupling pin is moved out of the coupling recess. A positive coupling may be provided for non-rotatably connecting the tool head housing to the body in preferred angular positions and a friction clutch may be provided for connecting the tool head housing to the body in intermediate positions.

The drive spindle may consist of two sections, which are non-rotatably interconnected but longitudinally displaceable relative to each other and the body may consist of a tool slide, which is adjustable along the drive spindle. Such an arrangement will permit of an additional adjustment of the tool head and will not appreciably increase the structural expenditure. Together with the tool slide, the tool head will be adjusted in the direction of the drive spindle and the rotary tool will be adjusted transversely to its axis of rotation.

DETAILED DESCRIPTION OF THE PREFERRED EMBODIMENT

Figure 1:
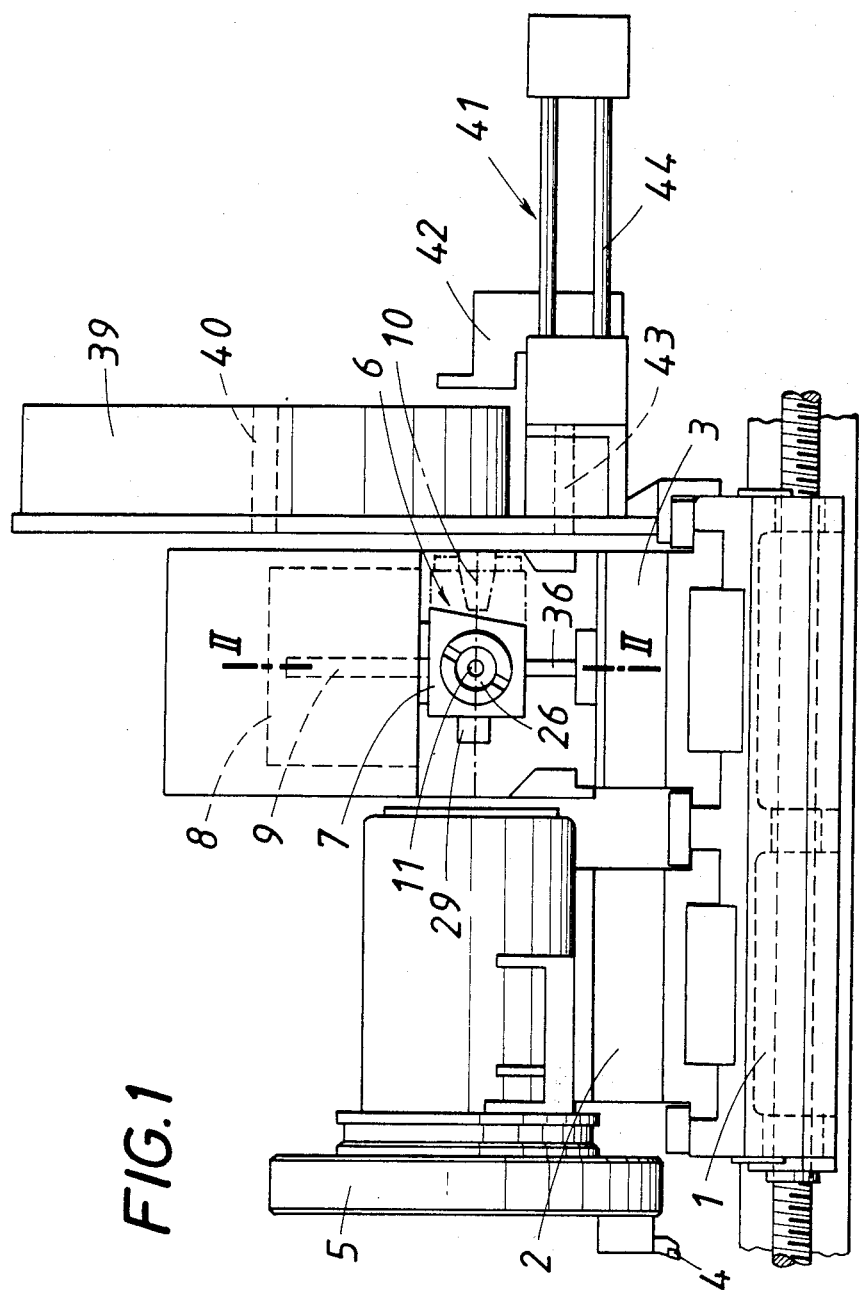
FIG. 1 is a diagrammatic front elevation showing a cross slide for a lathe in accordance with the invention.
Figure 2:
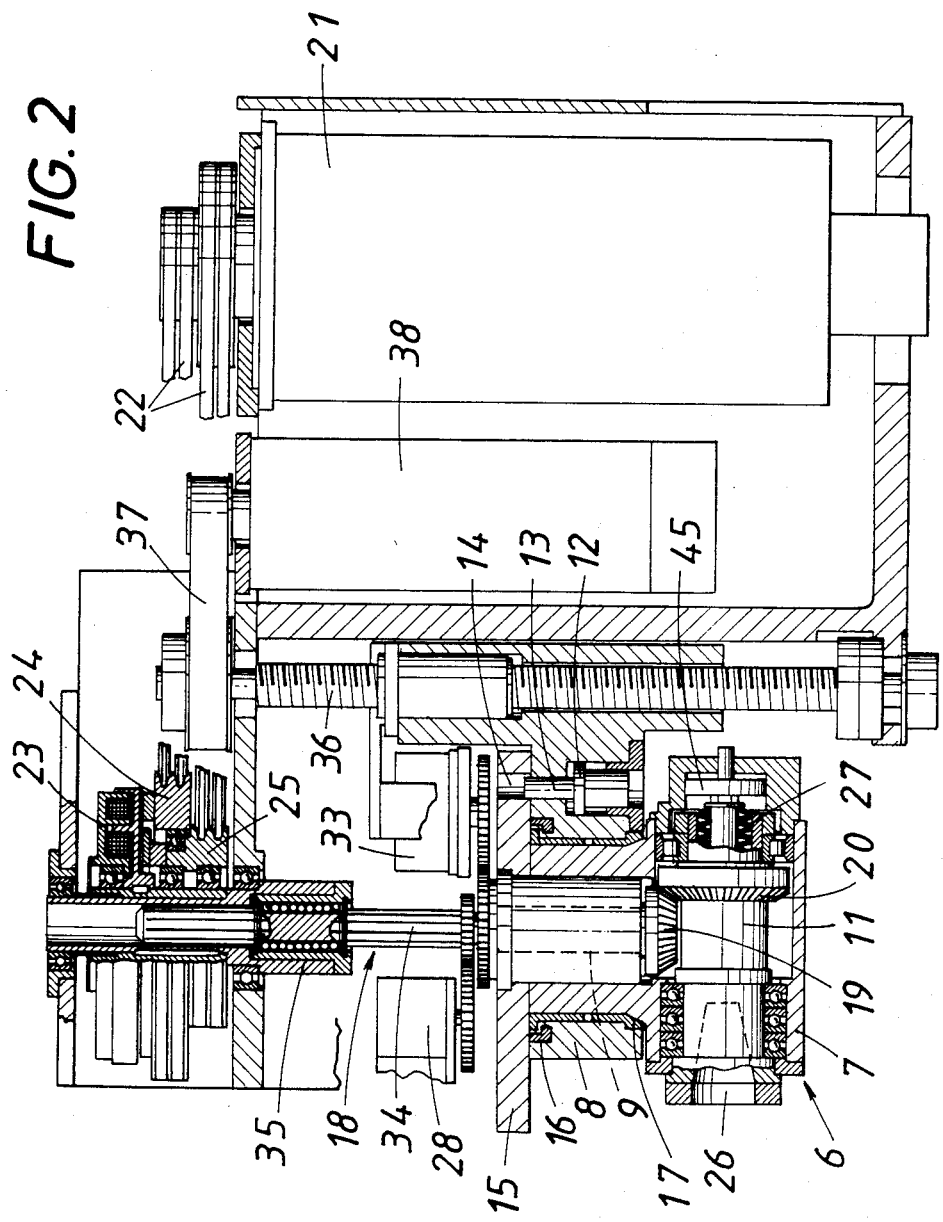
FIG. 2 is an enlarged sectional view taken on line II—II in FIG. 1.

An illustrative embodiment of the invention is shown on the drawing.

As is apparent from FIG. 1, a saddle 1 of a lathe is provided with two flat guides, on which respective cross slides 2 and 3 are slidably mounted. The cross slide 2 carries a turret 5, which carries lathe tools 4. The cross slide 3 carries a tool head 6 for receiving a rotary tool, such as a boring, drilling or milling tool. Owing to that arrangement the workpiece chucked in the lathe can be machined with lathe tools and rotating tools in succession without a need for rechucking.

Because the range of the machining operations which can be performed by the lathe depends on the axes about which the tool head 6 is adjustable, the means for mounting that tool head are particularly significant. In the embodiment shown by way of example the tool head comprises a tool head housing 7 mounted in a body 8 of the cross slide for an angular adjustment about an axis 9 extending perpendicularly to the longitudinal axis 10 of the lathe and at right angles to the tool spindle 11 that is rotatably mounted in the tool head housing 7. The longitudinal axis 10 of the lathe is defined by the headstock and the tailstock of the lathe. In this arrangement, the tool head housing 7 can be angularly adjusted in the body 8 to move the tool spindle 11 to any desired position between the end position shown in FIG. 1, in which the tool spindle 11 is at right angles to the longitudinal axis 10 of the lathe, and another end position, in which the tool spindle is parallel to longitudinal axis 10. The tool head housing 7 may be connected to the body 8 in said end positions of the tool spindle 11 by a positive clutch which comprises a coupling pin 13, slidably mounted in the tool head body 8 and adjustable by a piston 12 and which is adapted to be inserted into mating coupling recesses 14 in a coupling disc 15, which is non-rotatably connected to the tool head housing 7. In the intermediate positions of the tool spindle, the housing 7 is frictionally connected to the tool head body 8 by a frictional clutch means which includes fluid-operable, annular piston 16 which is slidably guided in annular recess 16a defined in an end face of body 8 facing coupling disc 15 and, in response to the application of fluid pressure entering guide recess 16a through pressure fluid conduit 16b in body 8, acts on coupling disc 15 and forces a conical clamping extension 17 into and out of a mating annular recess 17a formed in the tool head housing 7. As shown, a two-part annular sliding shell 8a is affixed to body 8 to facilitate axial gliding of body 8 along housing 7 upon actuation of piston 16, a lubricant being applied to the gliding surfaces through annular recess 8b in the two-part sliding shell. Conical clamping extension 17 is formed by the lower end of sliding shell 8a and the conical clamping face of this extension will frictionally engage mating annular recess 17a in housing 7 to lock body 8 to housing 7 in any desired intermediate position of the tool spindle.

The tool spindle 11 is driven by a drive spindle 18 which is mounted in the body 8 for rotation about the axis 9 of the tool head housing 7 and is operatively connected to the tool spindle 11 by miter gear drive consisting of two bevel gears 19 and 20. A d.c. motor 21 is operable to drive the drive spindle 18 by means of a two-stage vee belt drive 22. The vee belt drive 22 is adapted to be shifted by means of an electromagnetic clutch 23 which selectively couples one or the other of the two vee belt pulleys 24 and 25 to the drive spindle 18. The boring, drilling or milling tool to be used is inserted in a toolholder 26 of the tool spindle 11 and is fixed by a set of multiple disc springs 27 so that the tool can be driven by the d.c. motor 21. When the tool is to be changed by a mechanical operation, the toolholder 26 must be in an angular position in which it is adapted to receive the tool that is to be inserted. For this reason, the angular position of the tool spindle 11 is indicated by an angular position indicator 28, which detects the angular position by means of the drive spindle 18 through the intermediary of a transmission having the same transmission ratio as the bevel gears 19 and 20 of the miter gear drive between the drive spindle 18 and the tool spindle 11.

Figure 3:
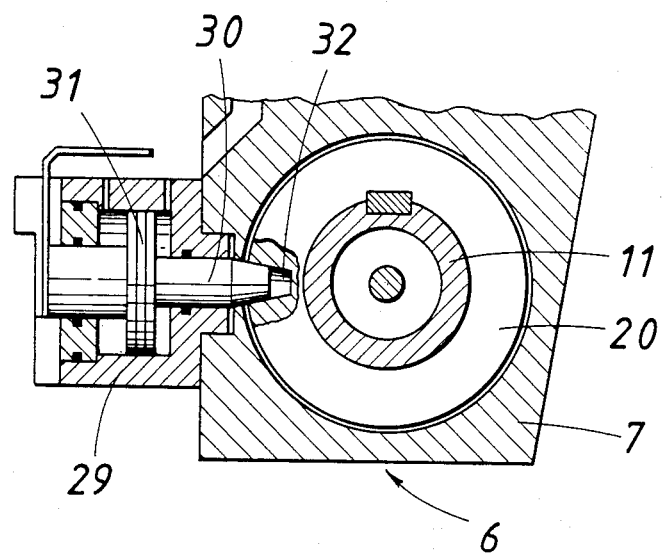
FIG. 3 is a transverse sectional view showing the tool head and taken on a line adjacent to the clutch provided between the tool head housing and the tool spindle.
Figure 4:
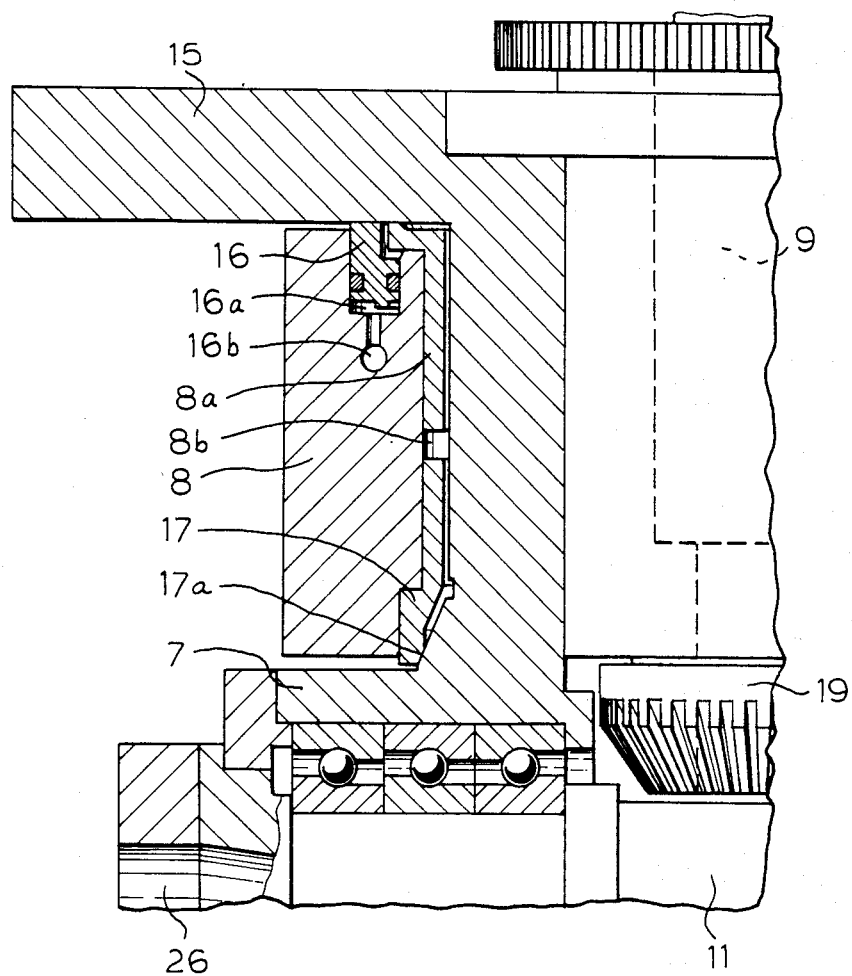
FIG. 4 is an enlarged fragmentary view similar to that of FIG. 2 and showing the frictional clutch means in detail.

The angular adjustment of the tool head housing 7 relative to the body 8 is also effected by means of the drive spindle 18. For this purpose, the tool head housing 7 carries a clutch 29, which is shown in FIG. 3 and is operable to prevent relative rotation between the tool head housing 7 and the tool spindle 11. The connection between the housing and the spindle can easily be established by a coupling pin 30 which extends radially with respect to the tool spindle 11 and is movable in the radial direction by a fluid-operable double-acting piston 31 urging the coupling pin 30 into and out of a mating coupling recess 32, which in accordance with FIG. 3 is formed in the bevel gear 20 of the angle drive that is provided between the drive spindle 18 and the tool spindle 11. The angular position which is to be assumed by the tool spindle 11 when the clutch 29 is to be engaged is indicated by the angular position indicator 28. When the tool head housing 7 has been connected to the tool spindle 11 or to the drive spindle 18, the connection between the tool head housing 7 and the body 8 is eliminated and the drive spindle 18 can then be operated to move the tool head housing 7 to the desired angular position. Another angular position indicator 33 is provided to indicate the angular position of the tool head housing 7 relative to the body 8.

To permit also an adjustment of the tool head 6 transversely to the tool spindle 11, the drive spindle 18 consists of two sections 34 and 35, which are non-rotatably connected but axially displaceable relative to each other. In the present embodiment, the two sections 34 and 35 are coupled by balls guided in axial keyways of the sections 34 and 35. Because the body 8 consists of a tool slide which is displaceable along the drive shaft 18, the additional adjustment which is desired can be effected without restraining the other adjustments. The body 8 which constitutes a tool slide can be adjusted by means of a power screw 36, which is driven by a cogged vee belt drive 37 from a positioning motor 38.

It is apparent from FIG. 1 that a tool change can be effected in a simple manner when the tool head 6 has been pivotally moved to the angular position indicated in phantom if the saddle 1 carries a tool magazine which is rotatable about an axis 40 that is parallel to the longitudinal axis 10 of the lathe and the saddle 1 carries also a tool-changing device 41 having a gripper 42, which is pivoted on an axis 43 which is parallel to the axis 40 and said gripper can be adjusted along the axis 43 by a positioning drive 44. When the tool head 6 is in the angular position indicated in phantom, the tool spindle 11 is parallel to the axis of rotation 40 of the tool magazine 39 and parallel to the pivotal axis 43 of the gripper 42 and it is then sufficient to impart an axial displacement to the gripper 42 for an insertion of a tool into the tool head 6 or into the tool magazine 39. The tool is transferred between the tool head 6 and the tool magazine 39 by a pivotal movement of the gripper 42. The tool can be released in the toolholder 26 by means of a piston 45, which overcomes the force exerted by the multiple spring 27.

We claim:
1. A lathe comprising a cross slide which comprises
   (a) a body,
   (b) a tool head housing mounted in the body for angular adjustment about a first axis between respective angular end positions,
      (1) the housing including a coupling disc and

(2) the body being axially glidable with respect to the housing, (c) a tool spindle mounted in the tool head housing for rotation about a second axis, (1) the first and second axes extending perpendicularly to each other, (d) a toolholder carried by the tool spindle, (e) a drive spindle mounted in the body for rotation about the first axis, (f) a miter gear drive operatively connecting the drive spindle to the tool spindle, the miter gear drive comprising (1) a bevel gear affixed to the tool spindle, (g) coupling means selectively connecting the tool head housing to the body in each end position to prevent relative rotation between the body and the tool head housing wherein the tool spindle is mounted, the coupling means including (1) a coupling pin mounted in the body and radially movable relative to the tool spindle, and (2) a coupling recess in the coupling disk and adapted to receive the coupling pin, and (h) a frictional clutch means for frictionally connecting the tool head housing to the body in any angular position between the end positions, the clutch means including (1) a fluid-operable annular piston slidably guided in an annular recess defined in an end face of the body facing the coupling disc of the tool head housing and the piston engaging the coupling disc in response to the application of fluid pressure and causing axial gliding of the body with respect to the housing, and (2) a clamping extension affixed to the body for axially gliding therewith and having a conical clamping face facing a mating annular recess in the housing for frictional engagement therewith to lock the body to the housing in any desired intermediate position of the tool spindle.

2. The lathe of claim 1, wherein the body constitutes a tool-carrying slide adjustable in the cross slide along the first axis, and the drive spindle consists of two sections connected to each other to prevent relative rotation therebetween and axially displaceable relative to each other.

* * * * *